(12) United States Patent
Kularatna et al.

(10) Patent No.: US 9,136,771 B2
(45) Date of Patent: Sep. 15, 2015

(54) DIGITAL CONTROL FOR CONTROLLING AND LINEARIZING AN AC IMPEDANCE

(75) Inventors: Nihal Aluthwela Domingo Vithanage Kularatna, Hamilton (NZ); Mutunacharige Damayanthi Chandani Srimathi Kumari Jinadasa, Hamilton (NZ)

(73) Assignee: WaikatoLink Limited, Hamilton (NZ)

( * ) Notice: Subject to any disclaimer, the term of this patent is extended or adjusted under 35 U.S.C. 154(b) by 293 days.

(21) Appl. No.: 12/989,053

(22) PCT Filed: Apr. 29, 2009

(86) PCT No.: PCT/NZ2009/000064
§ 371 (c)(1),
(2), (4) Date: Oct. 21, 2010

(87) PCT Pub. No.: WO2009/134151
PCT Pub. Date: Nov. 5, 2009

(65) Prior Publication Data
US 2011/0038186 A1 Feb. 17, 2011

Related U.S. Application Data

(60) Provisional application No. 61/048,915, filed on Apr. 29, 2008.

(51) Int. Cl.
*G05F 1/00* (2006.01)
*H02M 5/293* (2006.01)

(52) U.S. Cl.
CPC .................................... *H02M 5/293* (2013.01)

(58) Field of Classification Search
CPC .................................................... H02M 5/293
USPC ............ 323/207, 211, 237–245; 363/86, 149, 363/140; 315/311
See application file for complete search history.

(56) References Cited

U.S. PATENT DOCUMENTS

| 4,535,202 A | * | 8/1985 | Meunier ........................ 379/379 |
| 5,081,411 A | * | 1/1992 | Walker ........................... 323/324 |
| 6,057,652 A | | 5/2000 | Chen et al. |

(Continued)

OTHER PUBLICATIONS

Kularatna et al., A power sharing series power BJT array with isolated low voltage control for AC power control applications, Nov. 6, 2006, IEEE, IECON2006, 1715-1720.*

(Continued)

*Primary Examiner* — Jue Zhang
(74) *Attorney, Agent, or Firm* — Morrison & Foerster LLP

(57) ABSTRACT

An apparatus for regulating AC power of a power source in a power circuit is provided. The apparatus includes a full-wave bridge rectifier, a power transistor array, and a controller. The full-wave bridge rectifier is configured to receive an AC input put from the power source. The power transistor array is connected to the full-wave bridge rectifier. The power transistor array is configured to receive the AC input from the full-wave bridge rectifier and to generate an AC signal. The power transistor array may include only a single transistor or a plurality of transistors connected in series, for example. The controller is connected to the power transistor array. The controller is configured to receive the AC signal from the power transistor array, or the output of the AC regulator in some embodiments, and to determine a correction output to send to the power transistor array to control an AC impedance of the power circuit to generate an AC output.

14 Claims, 17 Drawing Sheets

(56) References Cited

U.S. PATENT DOCUMENTS

| | | | |
|---|---|---|---|
| 6,362,980 | B1 | 3/2002 | Ohashi et al. |
| 6,465,990 | B2 | 10/2002 | Acatrinei et al. |
| 6,548,983 | B2 * | 4/2003 | Avella et al. ............ 323/324 |
| 2004/0178784 | A1 | 9/2004 | Okamoto |

OTHER PUBLICATIONS

International Search Report and Written Opinion received for PCT Patent Application No. PCT/NZ2009/000064, mailed on Aug. 24, 2009, 9 pages.

International Preliminary Report on Patentability received for PCT Patent Application No. PCT/NZ2009/000064, mailed on Nov. 11, 2010, 7 pages.

Jinadasa, C., "High Power Linear AC Electronic Load for Testing UPS Systems", ME Thesis, The University of Waikato, 2007, 128 pages.

Tsai, Ming Tsung, "Analysis and Design of a Cost-Effective Series Connected AC Voltage Regulator", IEE Proc.-Electric Power Applications, vol. 151, No. 1, Jan. 2004, pp. 107-115.

Tsai, Ming Tsung, "Design of a Compact Series-Connected AC Voltage Regulator with an Improved Control Algorithm", IEEE Transactions on Industrial Electronics, vol. 51, No. 4, Aug. 2004, pp. 933-936.

\* cited by examiner

DIGITAL CONTROL FOR CONTROLLING AND LINEARIZING AN AC IMPEDANCE

CROSS-REFERENCE TO RELATED APPLICATION

This application claims the benefit under 35 USC 119(e) of U.S. Provisional Patent Application No. 61/048,915, filed Apr. 29, 2008, which is incorporated herein by reference in its entirety for all purposes.

BACKGROUND

1. Field

The present application relates to AC power control, and, more particularly, to digital control of AC impedance.

2. Description of the Related Art

With the proliferation of electronic systems based on submicron feature transistors, power quality has become a major concern for end users as well as the power generation and distribution authorities in the world. Voltage sags and surges are a very common phenomenon in many distribution circuits, particularly in overloaded distribution systems. Voltage sags and surges seem to be non-uniformly distributed and tend to follow the daily loading patterns of the utility. In many developing countries these problems may be more amplified. For example, FIG. 1 indicates a typical pattern of voltage fluctuations in an urban location sub-circuit in Sri Lanka.

In tackling the power quality issues on a given equipment site, three major considerations should be voltage sags and surges, transient surges such as lightning or power system originated ones, and harmonics and flicker, etc. In tackling voltage sags and surges at a given site, an AC voltage regulator is a particularly useful power conditioning equipment. Common regulator techniques used in AC voltage regulators are: (i) motor driven variacs; (ii) transformer tap changers; (iii) ferro-resonant regulators; (iv) thyristor-based systems; and (v) solid state AC regulators. Table 1 summarizes the performance of these regulator techniques from a practical standpoint. The information below is applicable to the single phase systems and output ratings from few 100 watts to few kilowatts.

TABLE 1

Comparison of AC voltage regulators

| Family | Techniques | Advantages | Disadvantages |
|---|---|---|---|
| Motor driven varies | A servo motor-based auto transformer with a voltage feedback loop | Simple construction High capacity Simple electronics High efficiency | Bulky Slow response Can get stuck at the lowest input voltage and create an overvoltage when the line voltage goes normal |
| Transformer tap changers | A transformer with multiple taps and a feedback loop is used to automatically change the taps at the output side when the input voltage fluctuates | High efficiency Easy to design Simple construction Low cost | If input voltage fluctuates frequently "tap dancing" could occur Arcing in taps can create problems with inductive loads Voltage transients can appear at output during tap changes |
| Thyristor-based designs | A series secondary winding or an auto transformer is used with a thyristor phase controlled technique at output to maintain the RMS voltage constant | Compact Low cost Efficient Fast response | High harmonic content at the output Could cause problems with inductive loads Filtering at output may be necessary for reducing RFI/EMI issues on the load side |
| Ferro-resonant regulators | A precisely gapped transformer is used in resonance with a capacitor to create a resonant circuit, while core saturation is used for regulating the output side | Very reliable Simple design without much electronic circuits Can withstand a fractional or few cycle outage at the input side Differential mode transients can be tolerated | Non sinusoidal output with flattened top Regulation depends on the load power factor Extremely sensitive to frequency fluctuations at the input side (such as in cases of small generator is used as supply) Low efficiency and no load power consumption of 20-30% of the VA rating |
| Solid state types | Either linear amplifier-based technique or switching technique-based compensation is used | Wide input range is possible Compact design may be possible (with a switching technique for voltage buck or | Complex circuitry (In switching technique-based versions) RFI/EMI problems in (switching |

TABLE 1-continued

Comparison of AC voltage regulators

| Family | Techniques | Advantages | Disadvantages |
|---|---|---|---|
| | | boost) | technique-based ones) Reliability issues in environments with high common mode transient surges) |

Given the variety of techniques described above used in commercial circumstances in the last two decades, a consistently popular technique has been the ferro-resonant-based techniques. Invented by Joseph Sola in 1930s, this technique is popular due to its operational reliability, simple construction, and the ability to regulate a fraction to a couple of AC cycles due to its LC resonant circuit tuned to the line frequency.

However, this technique is not energy efficient and dissipates approximately 200-300 watts per each KVA of its output due to the saturation behavior of the gapped transformer operating near saturation. In addition, output regulation of these systems can be very dependant on the power factor of the connected load. Other serious issues with these "ferrel" versions include, when the UPS or power conditioner is powered by a low cost standby generator and the frequency is not exactly 50 or 60 Hz, and with fluctuations with the loading on the generator, the resonant circuit can mistune and create various malfunctions. In Sri Lanka, for example, during the long power outage times due to drought conditions, some commercial line interactive type UPS systems with ferro-based AC regulation have ended up in failures when powered by low cost standby generators.

Apart from the above approaches used in commercial AVR techniques, there are a few other published approaches to achieve AC voltage regulation in single phase power conditioners. Many of these are based on a series AC voltage component generated by a switching pulse width modulation (PWM) scheme, or an electronic transformer-based technique (which also is based on a PWM switching technique). Another variation of a PWM-based series connected AC regulator technique is described in Tsai, M. T.; "Analysis and design of a cost-effective series connected AC voltage regulator", Electric Power Applications, IEEE Proceedings, Volume 151, Issue 1, 9 Jan. 2004 Page(s): 107-115, and Tsai, M. T.; "Design of a compact series-connected AC Voltage regulator with an improved control algorithm", Industrial Electronics, IEEE Transactions on, Volume 51, Issue 4, August 2004 Page(s): 933-936, each of which is herein incorporated by reference for all purposes. Almost all of these techniques have their own advantages and disadvantages. One common problem is the RFI/EMI issues due to PWM switching schemes. In particular, the complex issues of adapting them to medium and high output orders of few 100 W to few kilowatts in single phase power conditioning environments.

Thus, a continuously variable AC resistance may be used as the primary control element and provides advantages such as fast response, lower distortion, less dependence on load power factor and easy to manufacture magnetic components compared to a system based on a ferro-resonant transformer. Similarly, this design approach could be effectively used in an AC electronic load suitable for UPS and power conditioner testing, etc., if the non linear distortion of current in the power transistor array can be minimized by a suitable processor control approach.

Therefore, developing the basis of a digital control algorithm for reducing the harmonic distortion of the current waveform for providing better or comparable specifications with ferro-resonant types, with a simple and easy to build transformer, is desired. Embodiments could also be used as the basis for an AC electronic load suitable for AC line voltage requirements.

SUMMARY

In one exemplary embodiment, an apparatus for regulating AC power of a power source in a power circuit is provided. The apparatus includes a full-wave bridge rectifier, a power transistor array, and a controller. The full-wave bridge rectifier is configured to receive an AC input from the power source. The power transistor array is connected to the full-wave bridge rectifier. The power transistor array is configured to receive the AC input from the full-wave bridge rectifier and to generate an AC signal. The power transistor array may include only a single transistor or a plurality of transistors connected in series, for example. The controller is connected to the power transistor array. The controller is configured to receive the AC signal from the power transistor array, or the output of the AC regulator in some embodiments, and to determine a correction output to send to the power transistor array to control an AC impedance of the power circuit to generate an AC output.

In another exemplary embodiment, a computer-readable medium encoded with executable instructions for regulating AC power of a power source in a power circuit is provided. The instructions are for receiving an AC signal from a full-wave bridge rectifier and a power transistor array, generating a digital signal from the AC signal with an analog-to-digital converter, and determining a correction output based on the digital signal to send to the power transistor array to control an AC impedance of the power circuit.

Furthermore, in another exemplary embodiment a method for regulating AC power of a power source in a power circuit is provided. The method includes receiving an AC signal from a full-wave bridge rectifier and a power transistor array, generating a digital signal with an analog-to-digital converter, and determining a correction output based on the AC signal to send to the power transistor array to control an AC impedance of the power circuit.

DETAILED DESCRIPTION

Figure 1:
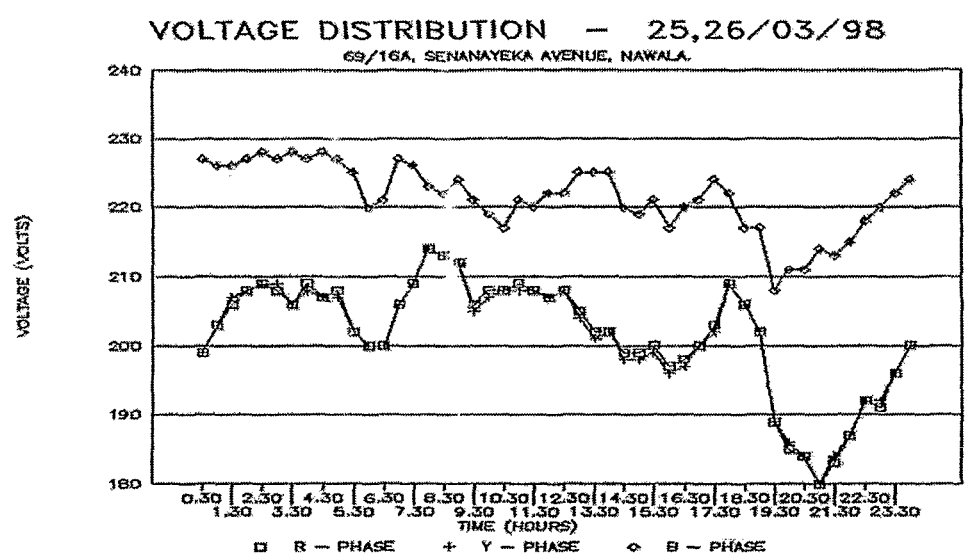
FIG. 1 depicts an exemplary voltage variation in an overloaded distribution line.

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Given the above summary, there are important factors relevant in developing AC voltage regulator techniques for modern power conditioning. For example, factors that may be considered are: (i) reliability of operation in surge-prone PQ environments; (ii) efficiency under all load levels and load power factor situations; (iii) RFI EMI minimization; (iv) harmonic minimization; (v) speed of the control loops within the regulator; (vi) operability within extremes of over and under voltage input line conditions and to a lesser extent; and (vii) energy storage for short duration ride-through.

Embodiments for designing a power transistor array with uniform voltage distribution across the elements and electrically isolated control inputs, suitable for a processor-based approach for controlling the harmonic distortion in the current waveform, are described below. Furthermore, the embodiments described below are suitable for AC control applications with lower harmonics. Moreover, embodiments of a linear AC load, based on digital control, are suitable for automatic testing of uninterruptible power supplies (UPS) and other AC-to-AC converter systems, such as power conditioners, etc. An advantage, for example, of the embodiments described below is that digital control can be used to minimize harmonics. This is illustrated, for example, in experimental results of exemplary prototypes for AVRs and electronic AC loads.

Furthermore, developing a variable AC impedance using transistors with sufficient power handling capability has several additional characteristics that are desired. For example, some characteristics are: (i) equal power dissipation and voltage distribution among transistor elements with reasonable device temperatures; (ii) fast transient capability and low harmonic distortion on the output waveform; (iii) electrical isolation for low voltage control circuitry; and (iv) simple and easy control. A use, for example, of an AC impedance, is linearizing the current over the entire range of instantaneous voltages during the AC cycle. Prior art provides design details related to developing a single phase AVR with the power handling capacity of the load in the order of few 100 watts to few kilowatts. In this case, embodiments described herein work for both sags and swells without any configuration changes. In contrast, in previous techniques, high efficiency near 100% is claimed in a configuration only for regulated output is always lower than the incoming rail voltage. Furthermore, the range of voltage fluctuations is low and the minimum input voltage is just 4 volts above the regulated output.

Embodiments of linearization techniques for a continuously variable AC resistance using a power transistor array are described below. In some embodiments, the power transistor array may be a series BJT array. This power transistor array provides high power dissipation capability and uniform voltage and power distribution across the individual transistors of the power transistor array. The power transistor array uses a set of opto-isolators to maintain the electrical isolation between the control circuits and the power stage. Described herein are approaches according to embodiments in developing an electronic AC load with microprocessor control. Linearization of the power transistor array resistance and electrically isolated input control are the prime targets in developing embodiments of the method described herein with 150VA capability based on a 4-element series BJT power transistor array. In other words, embodiments are described herein based on a power transistor array including four transistors. The technique described herein using BJT power transistor arrays could be extended to any output capability by selecting suitable power semiconductors, such as power BJTs, Power MOSFETS or IGBTs in embodiments. Additionally, the power transistor array may include only one transistor for low power requirement applications, for example.

A high power capable power transistor array is useful in various power conditioning applications, such as AC voltage regulation and harmonic control. In embodiments described herein, this could range from several tens to several hundreds watts of capacity. In addition, embodiments of the technique described herein can be used to develop AC electronic loads, etc. In an AC environment, if the impedance of a power transistor array can be made linear across the full AC cycle of 50 or 60 Hz, in addition to its continuous variability, it will be more useful as it minimizes harmonic distortion.

Furthermore, embodiments, which are not based on PWM switching technique, have advantages such as: (i) fast response; (ii) a simple 50/60 Hz transformer; (iii) a true RMS output control; and (iv) electrical isolation between low voltage control circuits and the power stage and minimum RFI/EMI issues. Embodiments described herein are based on a series connected power transistor array. Moreover, some embodiments may be used for purposes other than RMS output voltage control. Described herein are fundamentals and embodiments of applications of the technique of digitally controlling AC impedance.

I. Basic Concept of Impedance Control and Implementation of a 4-Element Power Transistor Array First, generalized theoretical and practical approaches for designing a power transistor array with uniform voltage distribution across the elements of the power transistor array and electrically isolated control inputs, suitable for a processor-based approach for controlling the harmonic distortion in the current waveform are described herein. Furthermore, embodiments described herein are suitable for AC control applications with lower harmonics.

Figure 2A:
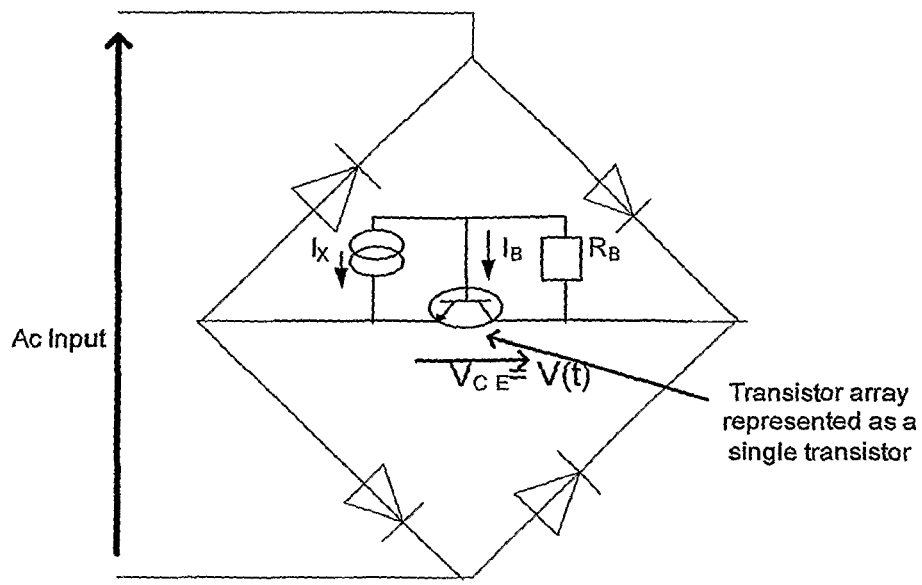
FIG. 2A depicts an exemplary simplified concept of AC impedance control using a BJT and a diode bridge, using the base current diversion principle.
Figure 2B:
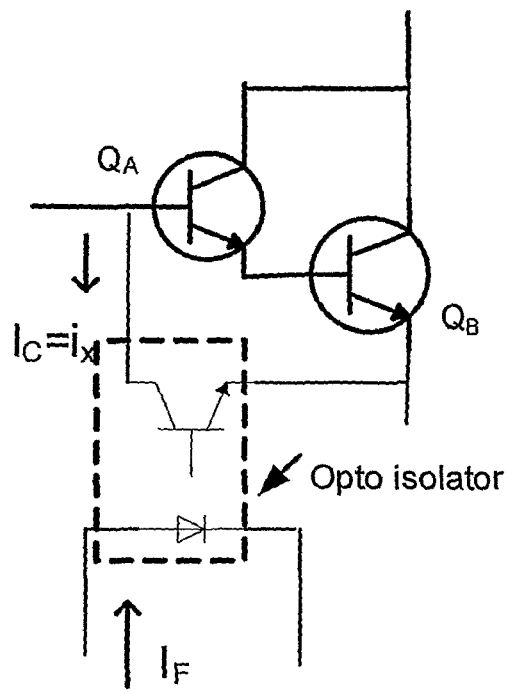
FIG. 2B depicts exemplary AC impedance control of the base current using the base current diversion principle using an opto-transistor.
Figure 2C:
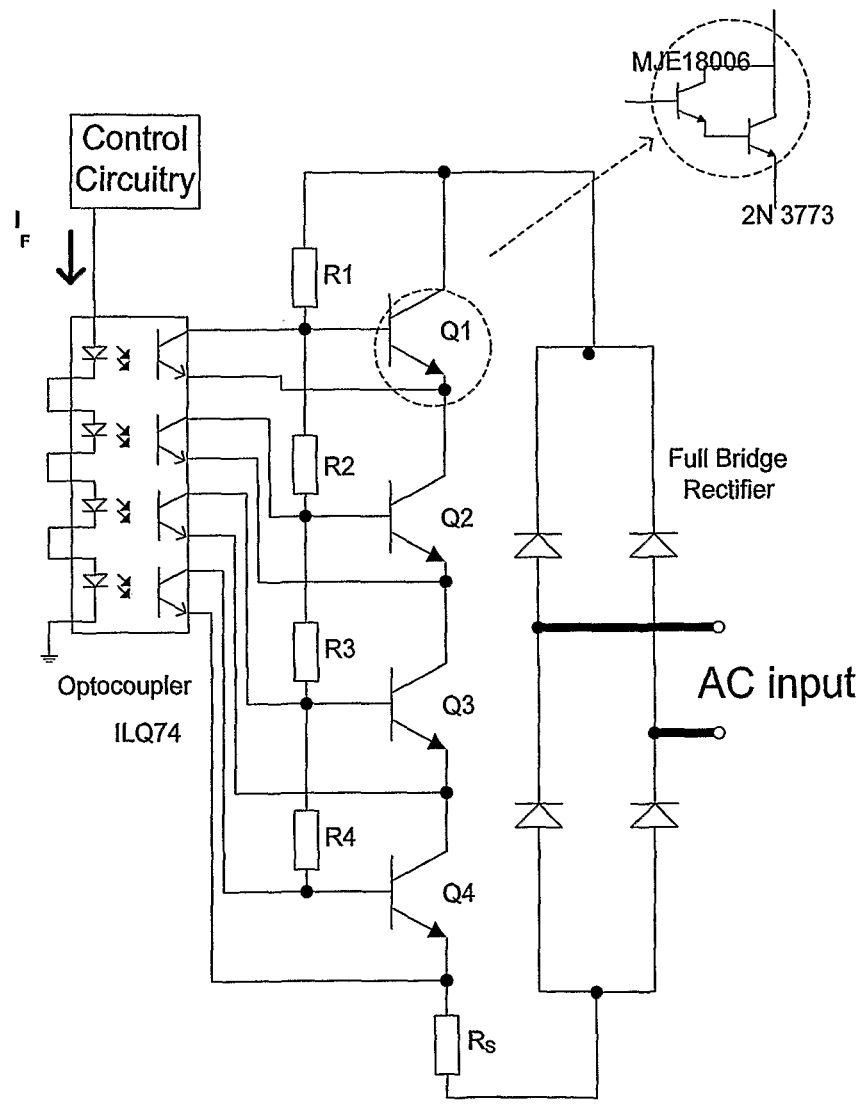
FIG. 2C depicts exemplary AC impedance control of the base current diversion principle implementation using a 4 element Darlington power transistor array with a quad opto-isolator.

An exemplary approach for changing the effective overall AC resistance of a power transistor array over a wide range is shown in FIGS. 2A, 2B, and 2C. FIG. 2A shows the simplified concept of control of the transistor and FIG. 2B indicates how an opto-isolator is usable for current diversion in the power transistor. FIG. 2C illustrates how series connected emitter diodes in an opto-isolator can be used to control a series connected bipolar power transistor array inserted between the bridge points of a diode bridge to achieve AC operational capability. When the power transistor array is used in 230V/50 Hz AC applications, such as in an AC voltage regulator, the instantaneous values can often vary up to a maximum of approximately 330 V for a range of input AC RMS voltages from 160V to 260V. (See, Kularatna, N: "Power electronics design handbook-low voltage components and applications"; Butterworth, 1998, Chapter 6, which is incorporated herein by reference in its entirety for all purposes). This high voltage requirement at high power loads dictates the use of multiple power transistors to share the loading.

For an n-element BJT power transistor array similar to FIG. 2C, it can be shown that, $$R_{Array} \approx \frac{nR_B}{\beta}\left(1 + \frac{i_x}{i_b}\right), \quad (1)$$

when, $$R_{B1} = \frac{R_B}{n}; R_{B2} = \frac{R_B}{(n-1)}; R_{B3} = \frac{R_B}{(n-2)}; \ldots R_{Bn} = R_B, \quad (2)$$

where $R_{Array}$ is the approximate effective instantaneous resistance at the AC input of the circuit in FIG. 2C, $i_b$ is the instantaneous base current, $i_x$ is the amount of base current diverted by the opto-transistors, $\beta$ is the current gain, and $R_{Bn}$ is the resistance between collector and base of the nth transistor (See, Kularatna, N & Cho, P: A power sharing series power BJT array with isolated low voltage control for AC power control applications, Proceeding of IECON 06, November 2006, pp 1715-1720).

For the case of the 4-element power transistor array in FIG. 1C, $$R_{Array} \approx \frac{4R_B}{\beta}\left(1 + \frac{i_x}{i_b}\right) \quad (3)$$

and, $$R_1 = \frac{R_B}{4}; R_2 = \frac{R_B}{3}; R_3 = \frac{R_B}{2}; R_4 = R_B. \quad (4)$$

(Base emitter voltage drops are neglected in these approximations and all transistors are expected to have identical characteristics.)

Based on the relationship in Eqn (3), the resistance between the collector and the emitter can be easily controlled either by varying $R_B$, or suitably changing the $i_x$ value. According to some embodiments, this could indicate that the ratio may need to be controlled. The ratio is defined as the base current diversion ratio (BCDR). For example, because the base-emitter voltage is very low compared to the instantaneous line voltages appearing across each power transistor in the power transistor array, the BCDR of the power semiconductor-stage can be practically controlled. In addition, using a power transistor array provides the necessary electrical isolation between the low voltage control signals and the power stage. In a practical exemplary application with Darlington pairs, the effective base emitter voltage will be between 1 to 2 Volts. This permits the concept of controlling the BCDR using opto-isolators and similar low voltage control circuits. For details, see Kularatna, N & Cho, P: A power sharing series power BJT array with isolated low voltage control for AC power control applications, Proceeding of IECON 06, November 2006, pp 1715-1720.

Similar design approach could be used with other power semiconductors, such as Power MOSFETs and IGBTs.

Figure 3A:
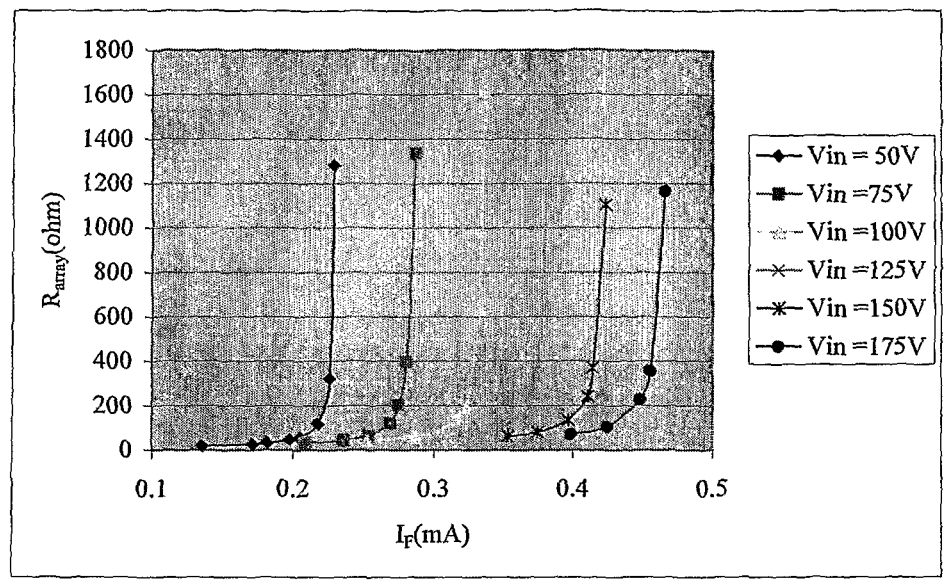
FIG. 3A depicts exemplary experimental results of a non-linear nature of the $R_{array}$ versus opto-diode current ($I_F$) at different line voltages.
Figure 3B:
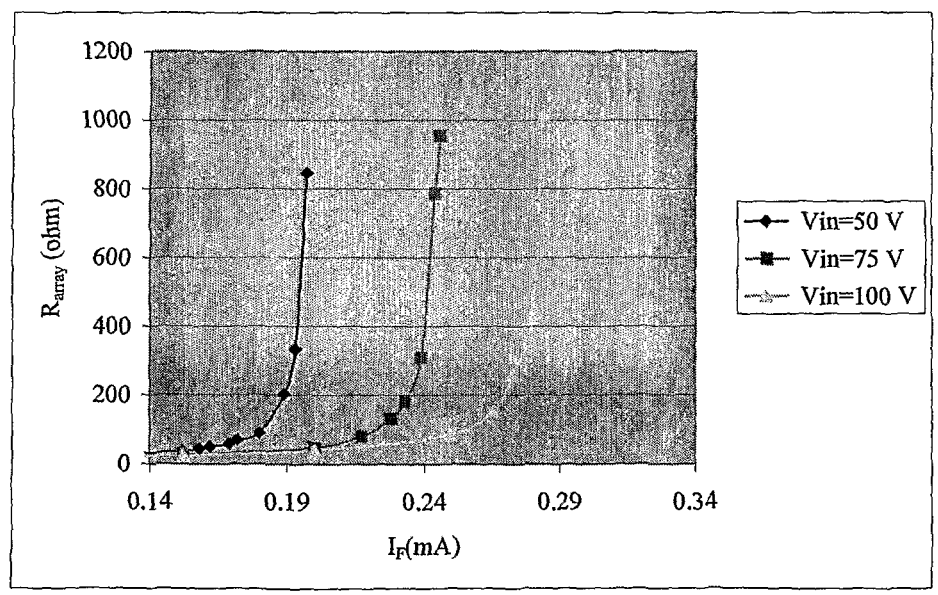
FIG. 3B depicts exemplary SPICE simulation results of a non-linear nature of the $R_{array}$ versus opto-diode current ($I_F$) at different line voltages.
Figure 4:
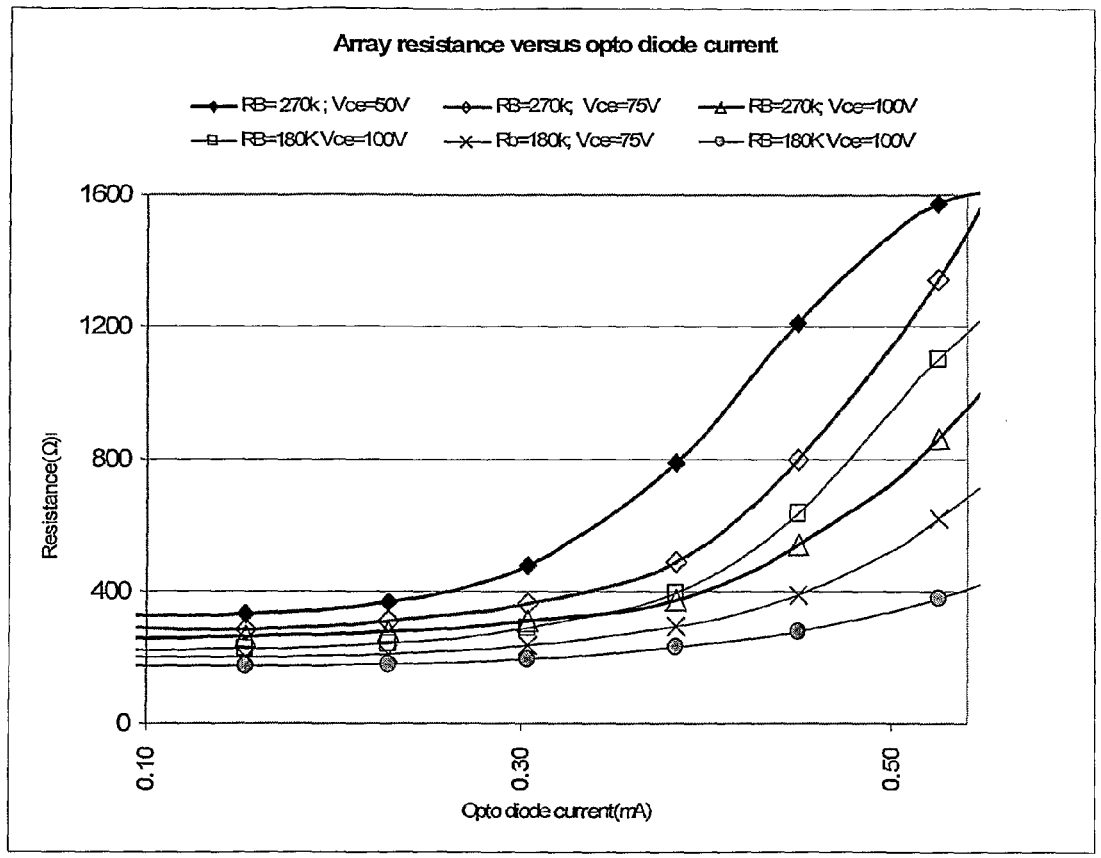
FIG. 4 depicts exemplary performance of a 4-element power transistor array for $R_B$ values.

II. Processor-Based Approach Linearization of the Power Transistor Array Resistance FIG. 3A depicts exemplary experimental results of the non linear behavior of the power transistor array impedance versus the opto-isolator input diode current ($I_F$) at different line voltages. FIG. 3B depicts exemplary SPICE simulation results of non-linear nature of the $R_{array}$ versus opto-diode current ($I_F$) at different line voltages. In FIGS. 3A and 3B, the exemplary case of the $R_B$ being 180 kΩ is depicted. Given the non-linear behavior of a transistor $v_{CE}$-$i_C$ relationship, the instantaneous current in the power transistor array will be non-linear under general conditions, and will depend on the instantaneous AC line voltage as well as the dependency of the gain of transistor on its instantaneous collector current. FIG. 4 depicts the exemplary performance of a 4-element power transistor array for $R_B$ values of 180 kΩ and 270 kΩ.

In order to control the non linearity of the value of $R_{Array}$, which is equivalent to $$\frac{V_{Array(rms)}}{I_{Array(rms)}},$$

output collector current in the opto-transistors can be controlled (See, Agilent Technologies: "Linear applications of optocouplers"; App note 951-2, 1999, which is incorporated herein by reference in its entirety for all purposes). The output collector current is based on the following relationship:

$$I_C = K\left(\frac{I_F}{I_{F'}}\right)^p, \tag{5}$$

where $I_C$ and $I_F$ are the opto-transistor collector current and the diode current in the emitter diode respectively, and, K, $I_{F'}$ and p are the parameters for the opto-isolator pairs (Agilent Technologies: "Linear applications of optocouplers"; App note 951-2, 1999, which is incorporated herein by reference in its entirety for all purposes).

From the basic transistor parameter relationships, assuming that all transistors carry approximately the same collector current, the $I_{array}$ is:

$$I_{Array} = I_S e^{qV_{BE}/kT}, \tag{6}$$

where q is the electron charge, k is the Boltzmann constant and T is the absolute temperature of the transistor junction. $I_s$ is the saturation current for the identical transistors $Q_1$ to $Q_4$. $V_{BE}$ is the voltage across the base-emitter.

By substituting the relationships in Eqn (5) and (6) in Eqn (1), $$R_{CE} \approx \frac{nR_B}{\beta}\left[1 + \beta \frac{K\left(\frac{I_F}{I_{F'}}\right)^p}{I_S e^{\frac{qV_{ng}}{kT}}}\right]. \tag{7}$$

By suitable mathematical manipulations, the following relationship for resistance across the power transistor array ($v_{CE}$) and the opto-diode forward current ($I_F$) for a fixed $R_{CE}$ value, neglecting the $v_{BE}$ compared to the instantaneous values of $v_{CE}$ is:

$$\ln V_{CE} = p\ln I_F + \frac{K\beta nR_B R_{CE}}{(\beta R_{CE} - nR_B)I_{F'}^p}. \tag{8}$$

Based on the relationship of Eqn (8) and using experimental data similar to FIG. 3A for the circuit arrangement in FIG. 2C, curve fitting techniques can be used to obtain the logarithmic relationships for voltage across the power transistor array ($V_{CE}$) and the current fed through the photo diodes ($I_F$) of the opto-isolator for each value of expected power transistor array resistance. By plotting these curves from the experimental results (which corresponds with the SPICE simulation results) together with a straight line fit, reasonably accurate values for slope m and intercept c values for a straight line approximation can be determined. Two selected examples are shown for power transistor array resistances of 500Ω and 50Ω in FIGS. 5A and 5B, respectively. From these graphs, one can see that the relationship is very close to a straight line fit, with matching $R^2$ values close to 1. (Jindasa, C. "High power linear electronic AC load for testing UPS systems." ME Thesis, The University of Waikato, 2007).

Figure 6A:
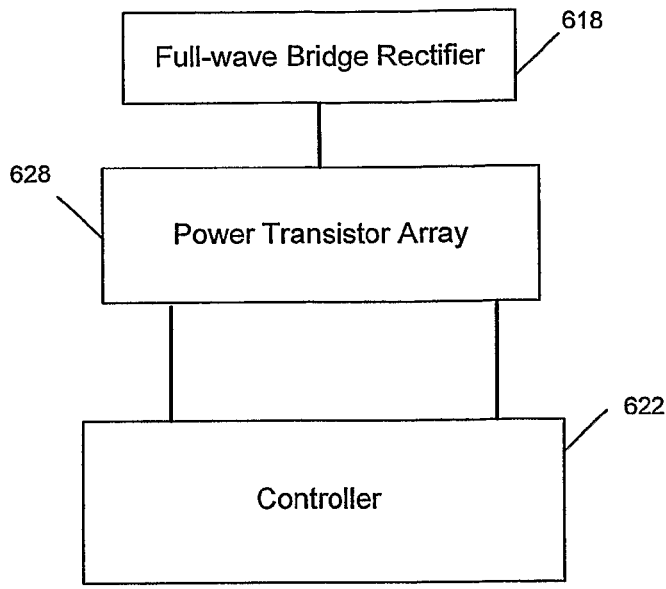
FIG. 6A depicts an exemplary embodiment of an AC electronic load implementation using opto-diode current control.
Figure 6B:
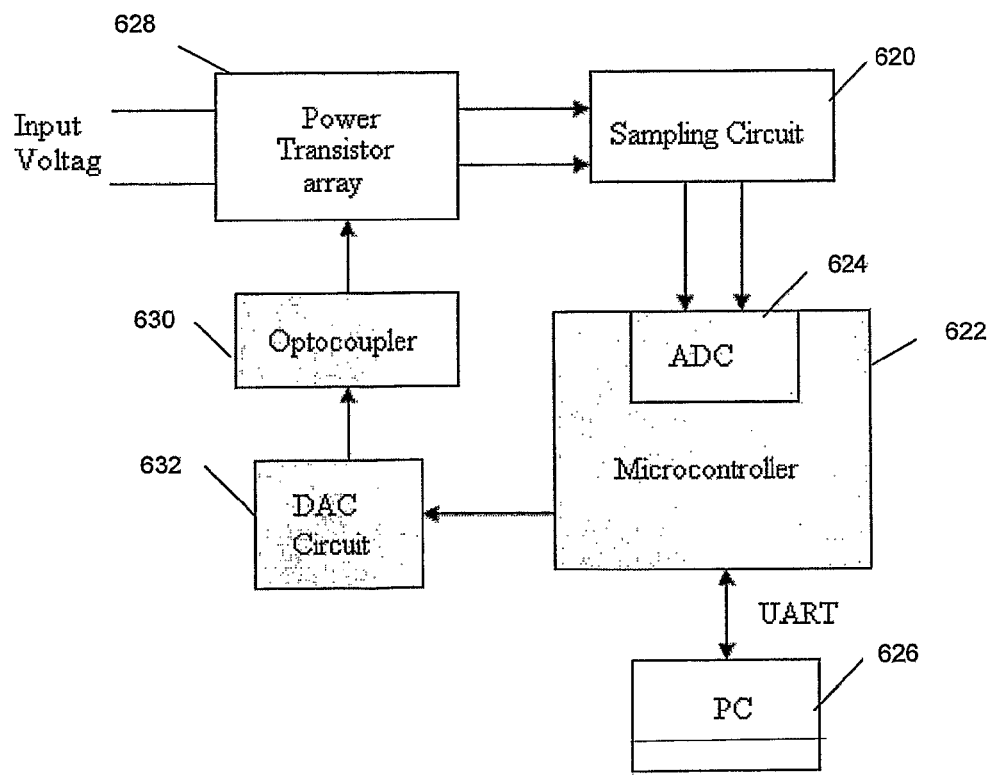
FIG. 6B depicts an exemplary block diagram of an AC electronic load implementation using opto-diode current control.

Given these relationships for a particular power transistor array, the values of m and c can be determined by an algorithm executed by a microprocessor in an arrangement illustrated in FIG. 6B, for example. A look-up table may store the experimental values for the particular power transistor array, and then derive the approximate values m and c suitable for each case of a straight line fit.

The description above leads towards the digital control approach to solve the linearity issue of the power transistor array by controlling the two parameters, slope m and intercept c, as described above. By allowing a microprocessor algorithm to take these parameters into account, opto-diode current can be controlled to adjust the instantaneous current through the power transistor array, by taking a relatively larger number of samples of the AC voltage waveform via sampling.

A general system, according to embodiments described herein, is illustrated in FIG. 6A. In general, a controller 622 is coupled to a power transistor array 628. A full-wave bridge rectifier 618 is coupled to the power transistor array 628. As shown in FIG. 6B, a sampling circuit 620 is used to receive the instantaneous line voltage value from the power transistor array 628, which will be fed into the microcontroller 622 including ADC hardware 624. The ADC hardware 624 is configured to convert analog signals to digital signals for the microcontroller 622. The microcontroller is operable for computing a correction output for application to the power transistor array 628 via the DAC circuit 632 and optocoupler 630. As such, the microcontroller 622 communicates with a DAC circuit 632, which is coupled to the optocoupler 630. The microcontroller 622 is coupled to a PC, or similar computing system 626. The microcontroller may be an 8 bit Zilog Z8 Encore processor, for example.

Figure 7:
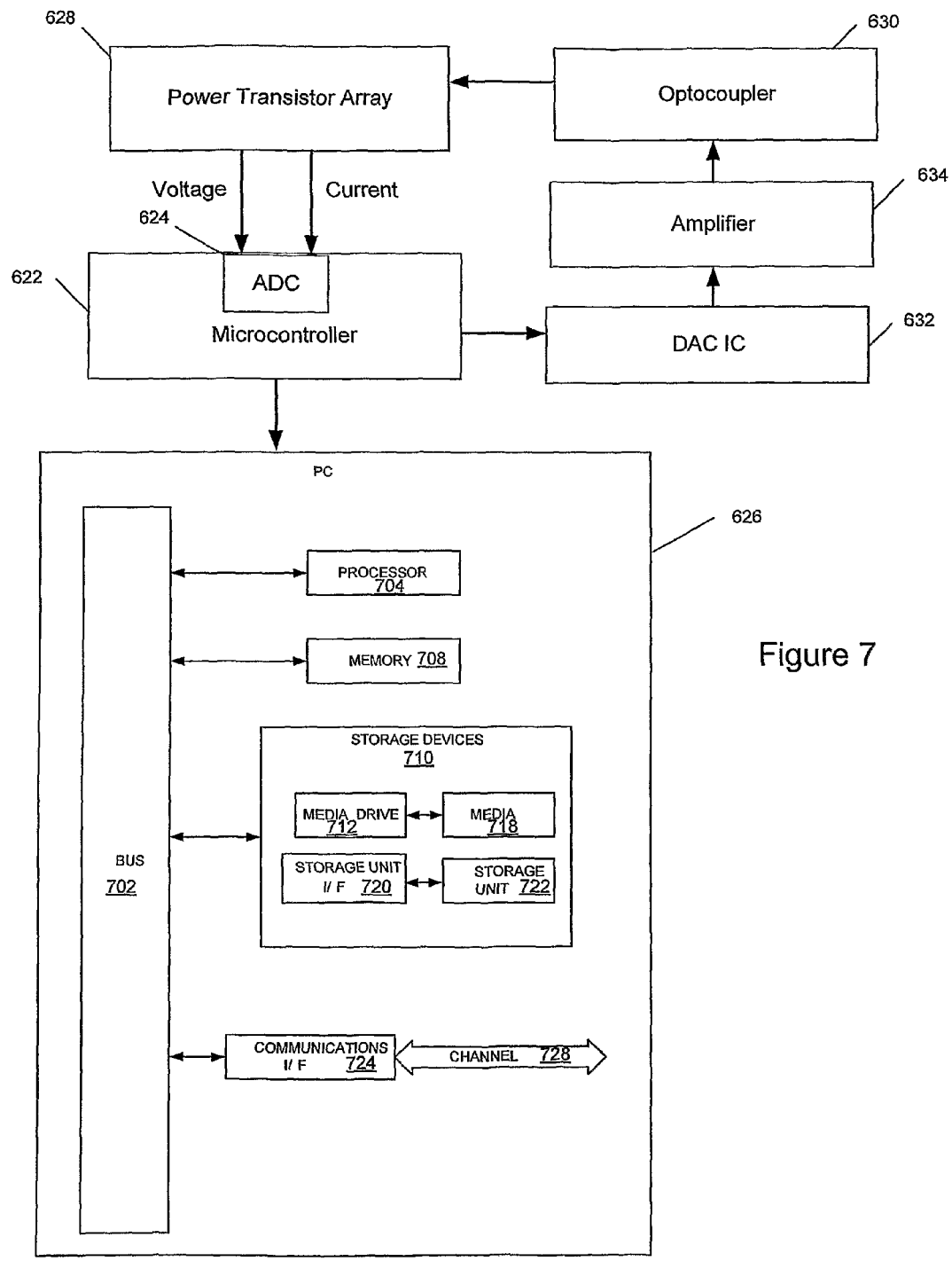
FIG. 7 depicts an exemplary embodiment of an AC electronic load implementation using opto-diode current control.

FIG. 7 illustrates an exemplary computing system 626 that may be employed to implement processing functionality for various embodiments (e.g., as a server device, client device, database, combinations thereof, and so on). Those skilled in the relevant art will also recognize how to implement the embodiments using other computer systems or architectures. Computing system 626 may represent, for example, a desktop, mainframe, or any other type of special or general purpose computing device as may be desirable or appropriate for a given application or environment. Computing system 626 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 626 can also include a main memory 708, for example random access memory (RAM), static RAM (SRAM), or other dynamic memory, for storing information and instructions to be executed by processor 704. Main memory 708 also may be used for storing temporary variables or other intermediate information during execution of instructions to be executed by processor 704. Computing system 626 may likewise include a read only memory (ROM) or other static storage device coupled to bus 702 for storing static information and instructions for processor 704.

The computing system 626 may also include information storage mechanism 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (Read or Read/Write), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable medium having stored therein particular computer software or data.

In alternative embodiments, information storage mechanism 710 may include other similar instrumentalities for allowing computer programs or other instructions or data to be loaded into computing system 626. Such instrumentalities may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 626.

Computing system 626 can also include a communications interface 724. Communications interface 724 can be used to allow software and data to be transferred between computing system 626 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical, or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

The terms "computer program product" and "computer-readable medium" may be used generally to refer to media such as, for example, memory 708, storage device 718, storage unit 722. These and other forms of computer-readable media may be involved in providing one or more sequences of one or more instructions to processor 704 for execution. Such instructions, generally referred to as "computer program code" (which may be grouped in the form of computer programs or other groupings), when executed, enable the computing system 626 to perform features or functions of embodiments.

In an embodiment where the elements are implemented using software, the software may be stored in a computer-readable medium and loaded into computing system 726 using, for example, removable storage drive 714, drive 712 or communications interface 724. The control logic (in this example, software instructions or computer program code), when executed by the processor 704, causes the processor 704 to perform the functions of the embodiments as described herein.

Figure 5A:
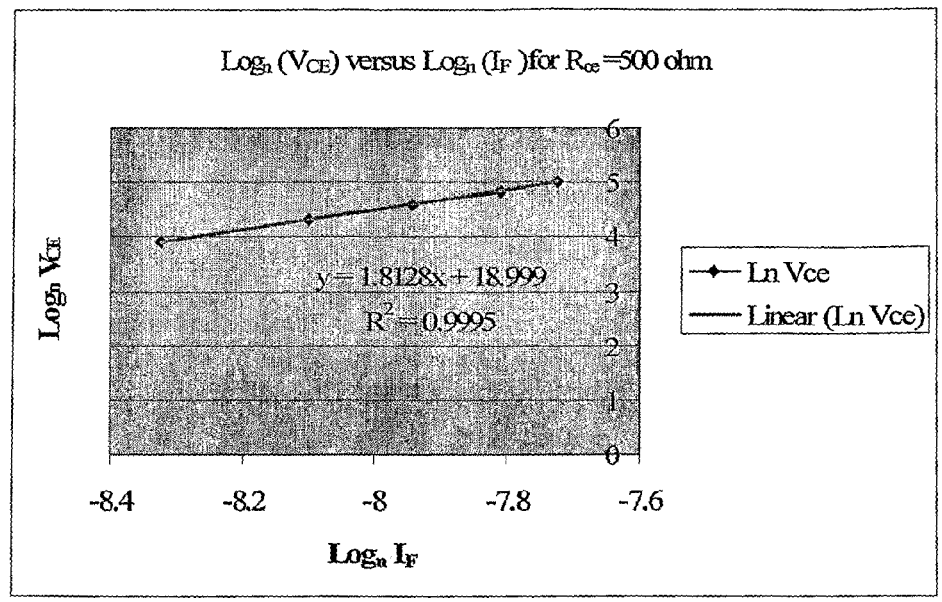
FIG. 5A depicts an exemplary graph of $Log_n(V_{CE})$ versus $Log_n(I_F)$ with a straight line fit.
Figure 5B:
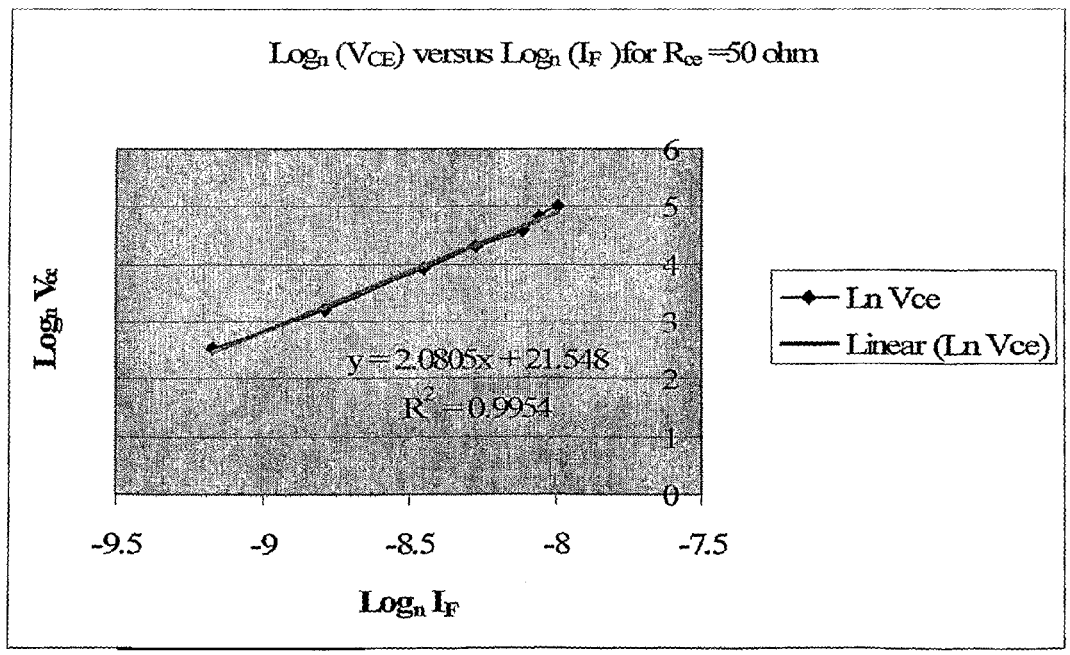
FIG. 5B depicts an exemplary graph of $Log_n(V_{CE})$ versus $Log_n(I_F)$ with a straight line fit.
Figure 8:
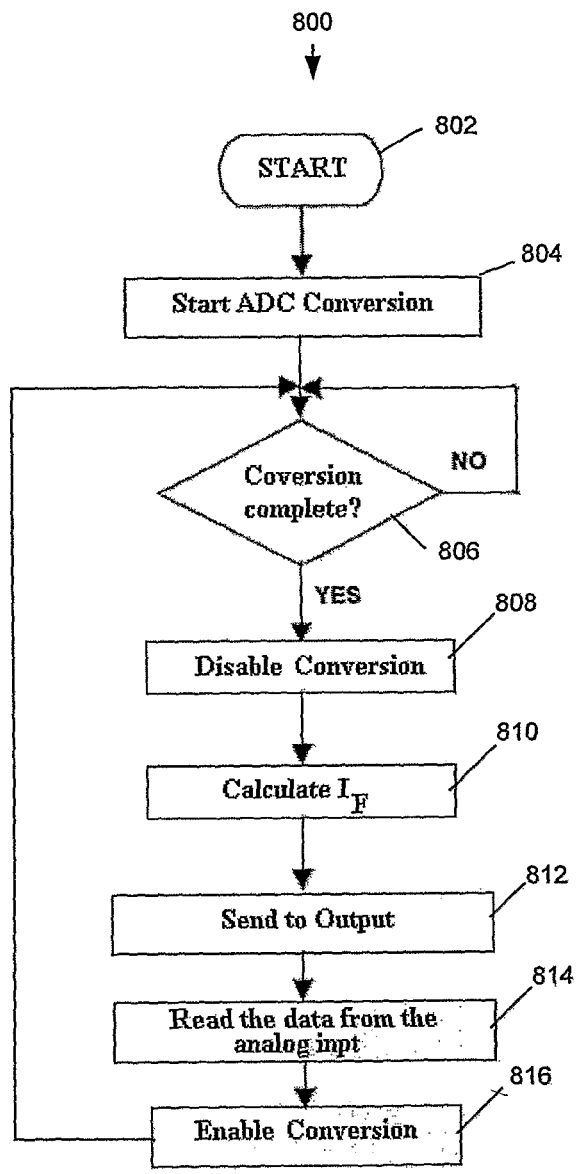
FIG. 8 depicts an exemplary flowchart of a processor-implemented method for digital control of AC impedance.

An object of embodiments of a processor-based system is to control the opto-diode current to achieve the expected impedance, based on the behavior of the power transistor array, as illustrated in FIGS. 5A and 5B during each sampling period. FIGS. 5A and 5B depict exemplary graphs of $\text{Log}_n$ ($V_{CE}$) versus $\text{Log}_n(I_F)$ for two different $R_{CE}$ value settings together with straight line fit in each case. The targeted $R_{CE}$ value is 500Ω in FIG. 5A. The targeted $R_{CE}$ value in FIG. 5B is 50Ω. Furthermore, a 1 kHz sampling rate was used in the exemplary system. With the sampling of the instantaneous AC line voltage, microprocessor program calculates the required opto-diode current (output from the DAC) over each sampling period within the 50 or 60 Hz AC cycle, as depicted in the exemplary flow chart of FIG. 8.

The method 800 starts at step 802. In step 804, an ADC conversion begins. With reference to FIG. 6B, the ADC conversion is performed by the ADC hardware 624. In step 806, it is determined whether the ADC conversion is complete. If so, in step 808, the ADC is disabled 808, and the $I_F$ is calculated in step 810, by the microcontroller 622. In step 812, the calculated value of $I_F$ is output to a DAC circuit 632. In step 816, the DAC conversion is enabled in the DAC circuit 632. The output of the DAC conversion is applied to the power transistor array for linearizing the AC impedance.

Figure 9:
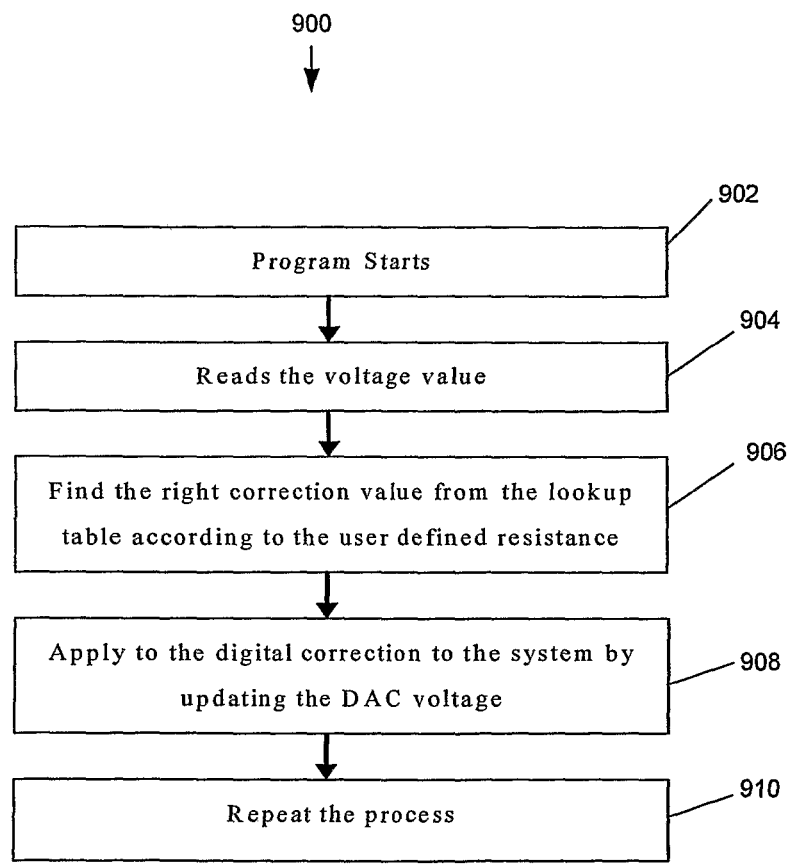
FIG. 9 depicts an exemplary flowchart of a processor-implemented method for digital control of AC impedance.

As another embodiment, FIG. 9 depicts a flowchart of a process 900 for determining a correction output at a microcontroller. In step 904, a voltage value is read. In step 906, the appropriate output correction value is looked up in a lookup table according to a user-defined resistance. In step 908, the output correction value updates the DAC voltage. The process 900 is repeated as many times as needed.

III. Limits and Boundaries of the Achievable AC Resistance

Due to Darlington pairs entering into a cutoff condition when the compound $V_{BE}$ value for the Darlington pair is less than about 1.0 Volt, and at a higher value of the opto-transistor current than the maximum instantaneous base current for a given resistance setting for the $R_{CE}$, the ability to control the power transistor array impedance diminishes. An example of this effect is being beyond the maximum BCDR, where the base current of each of the transistors is totally removed by the action of the opto-isolators. Under this condition, the effective resistance of the power transistor array is not controlled by the transistors, except for the leakage effects. If the transistor leakage effects are neglected and the conditions in Eqn (4) is maintained, the effective maximum resistance of the power transistor array reaches the value given by the series combination of the resistors $R_{B1}$ to $R_{Bn}$. As described above, $R_B$ is the resistance between collector and base of the $n^{th}$ transistor and $R_{CE}$ is the overall resistance of the power transistor array.

$$R_{CEmax} = R_B + \frac{R_B}{2} + \frac{R_B}{3} + \frac{R_B}{4} + \dots \frac{R_B}{n} \quad (9)$$

At the other extreme, when the current through the input diodes of the opto-isolators is zero (the case of minimum BCDR), the effective resistance of the power transistor array reduces to $$\frac{nR_B}{\beta}.$$

From Eqn (9) the maximum value of effective resistance for a power transistor array of 4 elements is approximately $2.1R_B$, neglecting the effects of leakage currents in transistors. From Eqn (7), the minimum resistance for the power transistor array is approximately $4R_B/\beta$. This indicates a very wide range of ideal possible performance within the boundaries.

IV. Experimental Results

Figure 10A:
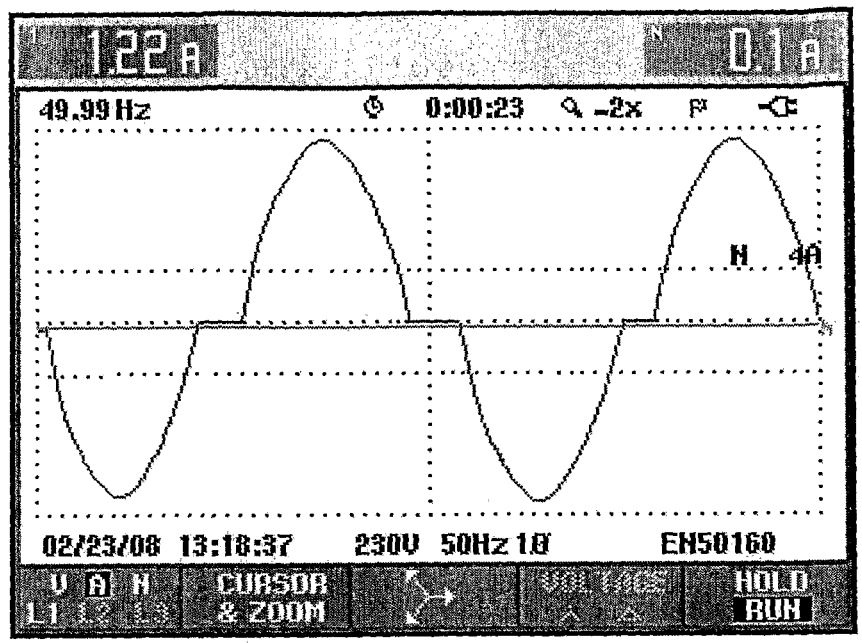
FIG. 10A depicts an exemplary graph of current drawn by the power transistor array without digital control.
Figure 10B:
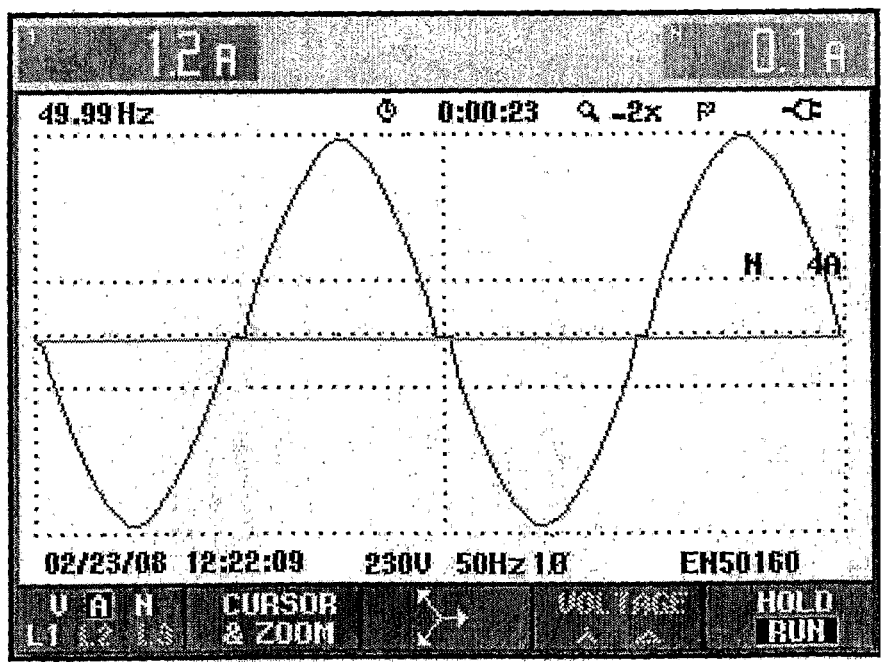
FIG. 10B depicts an exemplary graph of current drawn by the power transistor array with digital control.

FIGS. 10A and 10B illustrate exemplary power transistor array performance with and without digital control at different resistance settings. FIG. 10A illustrates the power transistor array performance with the resistance set at 75Ω without digital control. In contrast, FIG. 10B illustrates the power transistor array performance with the resistance set at 75Ω with digital control.

Figure 11A:
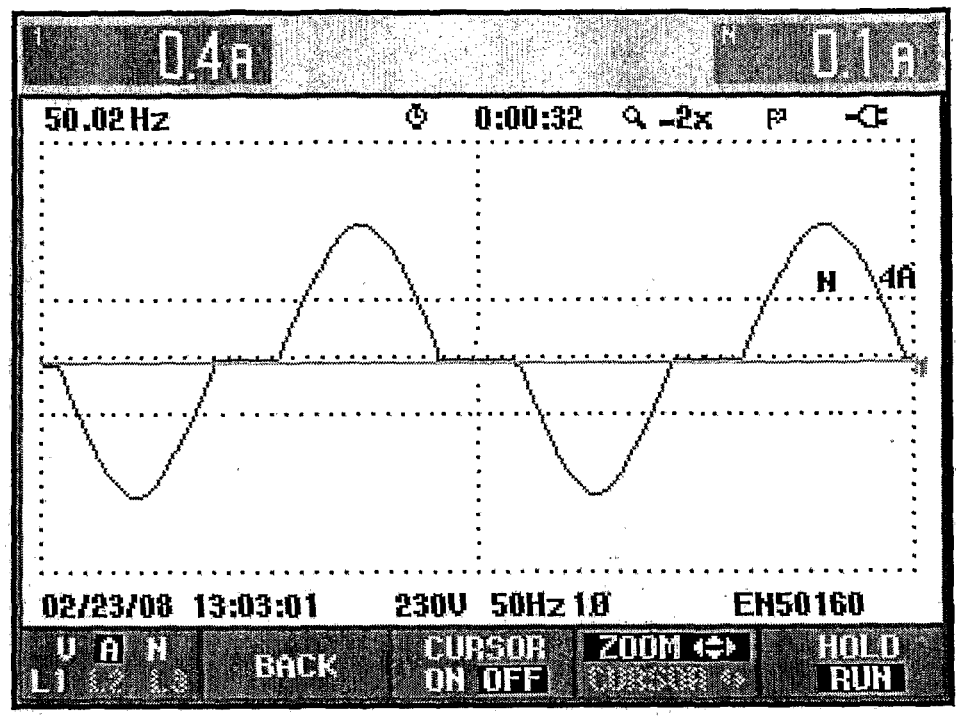
FIG. 11A depicts an exemplary graph of current drawn by the power transistor array without digital control.
Figure 11B:
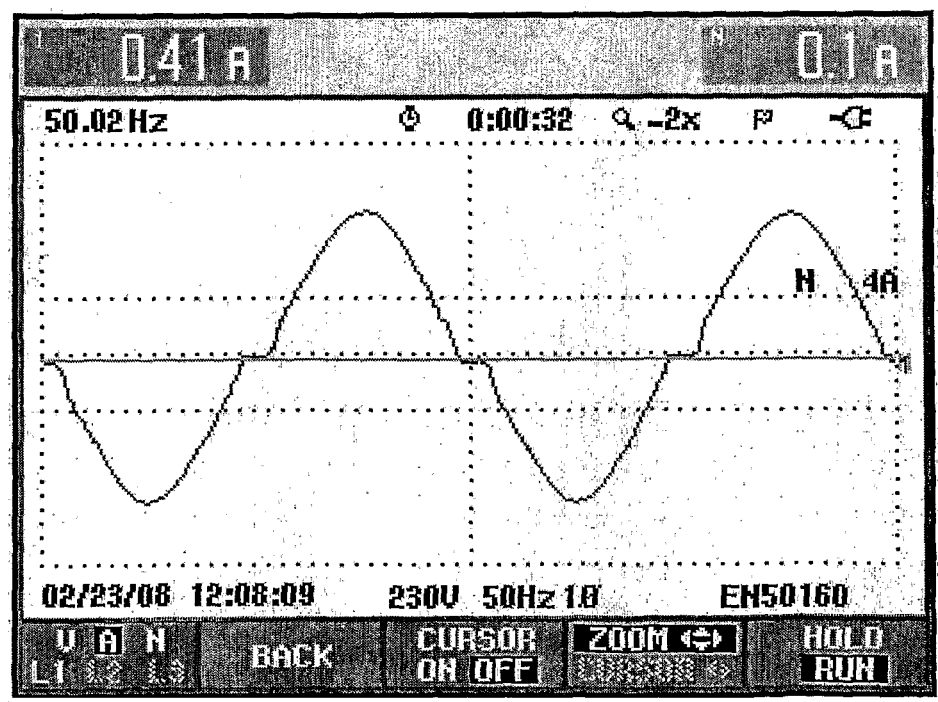
FIG. 11B depicts an exemplary graph of current drawn by the power transistor array with digital control.

FIGS. 11A and 11B illustrate another exemplary power transistor array performance with and without digital control at different resistance settings. FIG. 11A illustrates the power transistor array performance with the resistance set at 200Ω without digital control. In contrast, FIG. 11B illustrates the power transistor array performance with the resistance set at 200Ω with digital control.

Figure 12A:
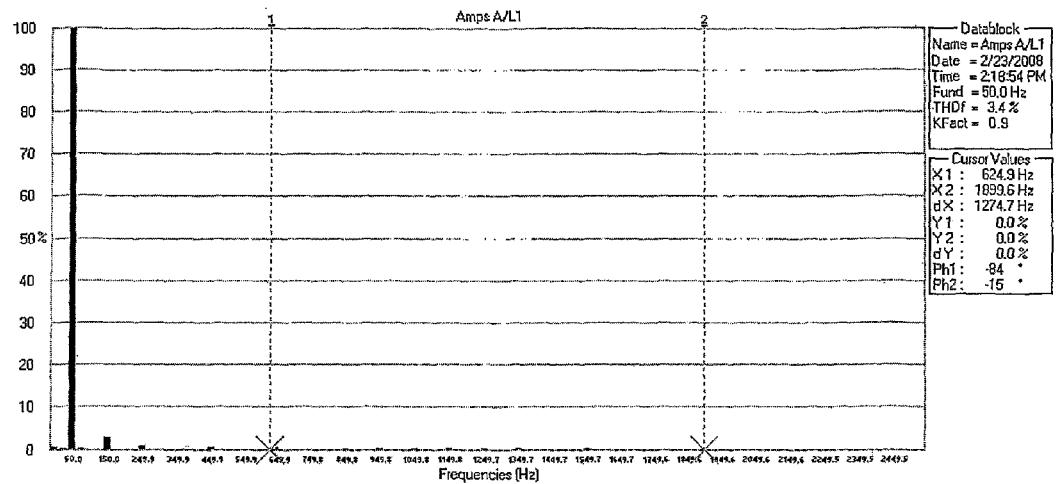
FIG. 12A depicts an exemplary FFT of the current waveform with digital control.
Figure 12B:
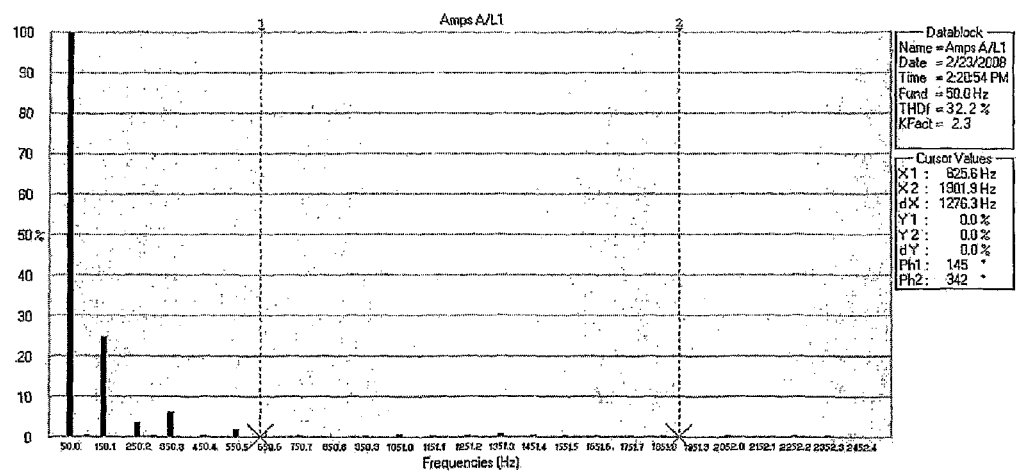
FIG. 12B depicts an exemplary FFT of the current waveform without digital control.

FIGS. 12A and 10B illustrate exemplary FFTs of the current waveform at 1.3 A. FIG. 12A illustrates the FFT with a digital controller. FIG. 12B illustrates the FFT without the digital controller.

V. Applications

Two applications of the embodiments are, for example, developing electronic AC loads for testing UPS and power conditioners, etc., and the development of fast acting AC line voltage regulators. The embodiments are based on developing an AC electronic load in contrast to previously disclosed approaches for developing an AC regulator. In embodiments of this AC voltage regulator technique, by using a suitably configured digital control technique, very low harmonic content in the AC output voltage can be achieved.

A. Design of an AC Regulator

Figure 13A:
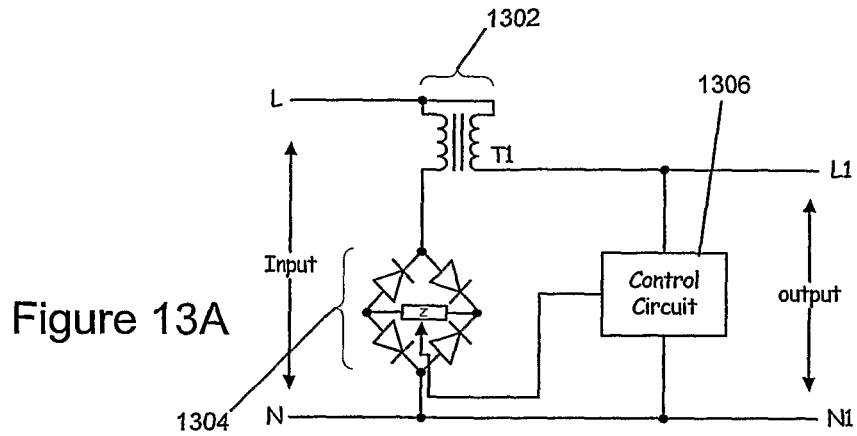
FIG. 13A depicts an exemplary basic BJT power transistor array-based AC regulator.
Figure 13B:
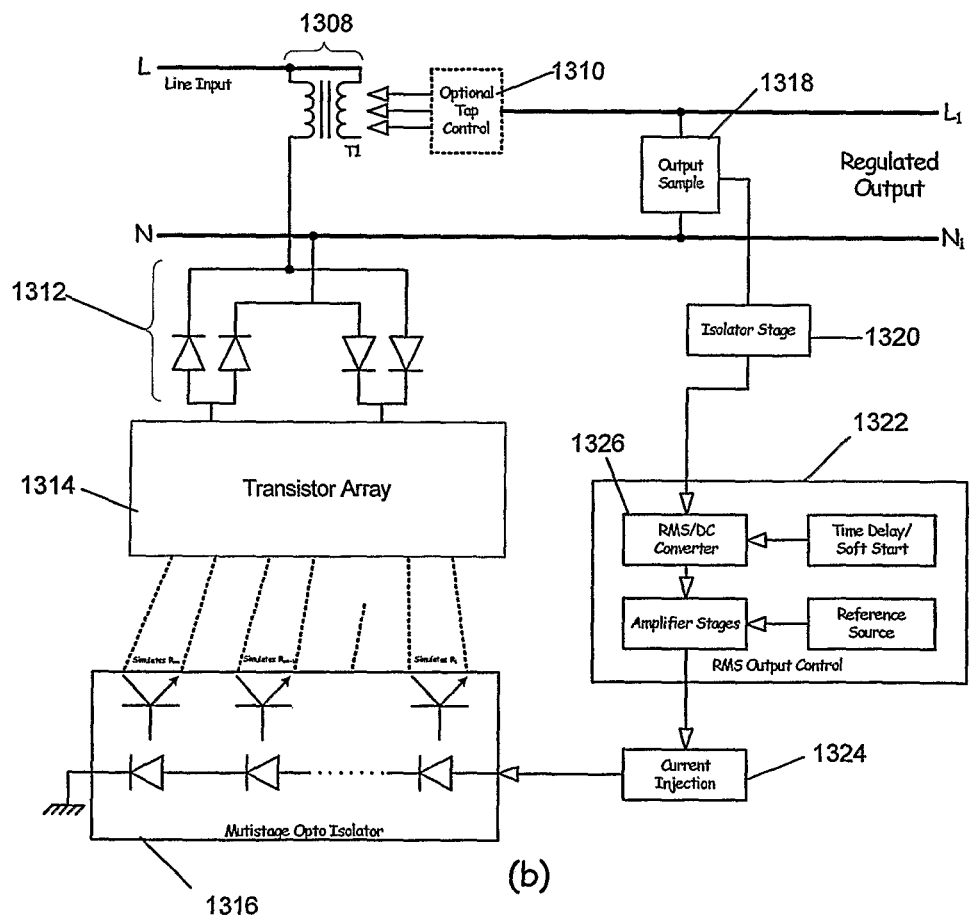
FIG. 13B depicts an exemplary implementation of a 1 kVA BJT power transistor array-based AC regulator.

FIGS. 13A and 13B illustrate a block diagram according to embodiments of a 230V/50 Hz capable 1 KVA regulator based on the power transistor array. In this way, frequency sensitivity, waveform distortion and the lower overall efficiency of the commonly used ferro-resonant regulators and the slow response of motor driven variacs are overcome.

FIG. 13A illustrates an exemplary approach to developing a power transistor array-based, or in this example, a BJT array-based, AC regulator. The transformer T1 1302 allows the boost or buck operation, an operation that allows for small voltage changes, based on the input voltage. Under this arrangement, following approximate relationship holds true:

$$V_{out} = V_{in}\left(1 + \frac{1}{N}\right) - \frac{R_{array}I_L}{N^2}, \tag{10}$$

where $V_{out}$ and $V_{in}$ are the output and input AC voltages, $I_L$ is the load current, N is the transformer turns ratio, and $R_{array}$ is the resistance of the power transistor array 1304.

Given the worst case line voltage situations, such as in FIG. 1, a microcontroller needs to operate from the lower input AC voltage limit, such as 160V, to a higher limit, such as 260V. For RMS output voltage control, the effective resistance of the power transistor array needs to be varied depending on the load current and the input voltage using a feedback loop according to FIG. 13B.

Figure 14A:
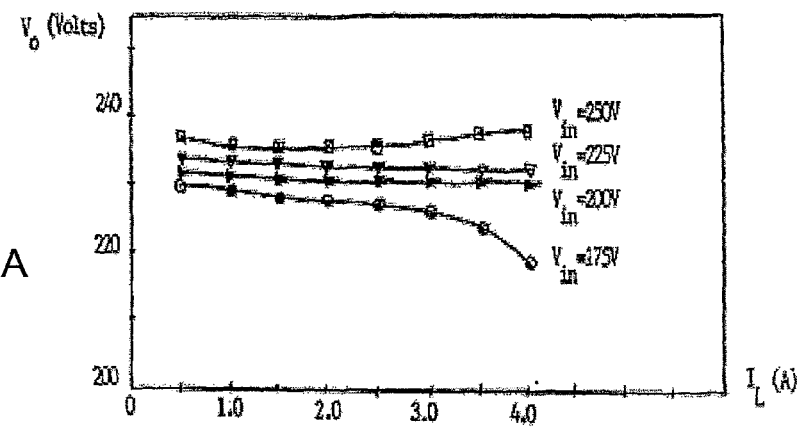
FIG. 14A depicts exemplary load regulation performance of an AC voltage regulator based on a 4-element power transistor array.
Figure 14B:
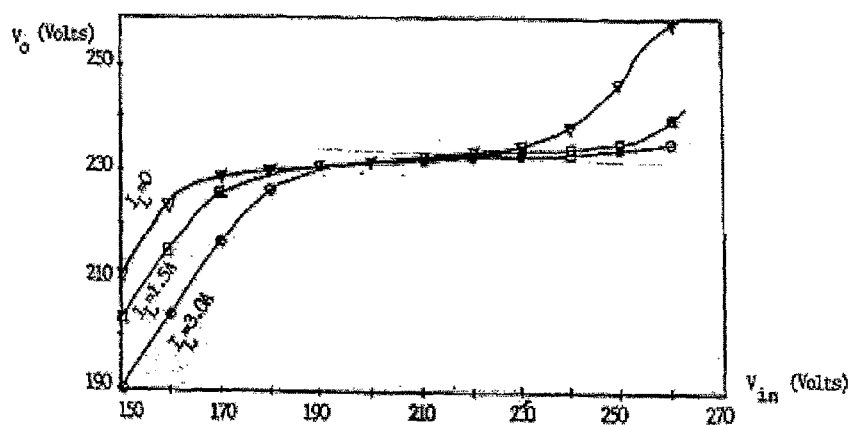
FIG. 14B depicts exemplary line regulation performance of an AC voltage regulator based on a 4-element power transistor array.
Figure 14C:
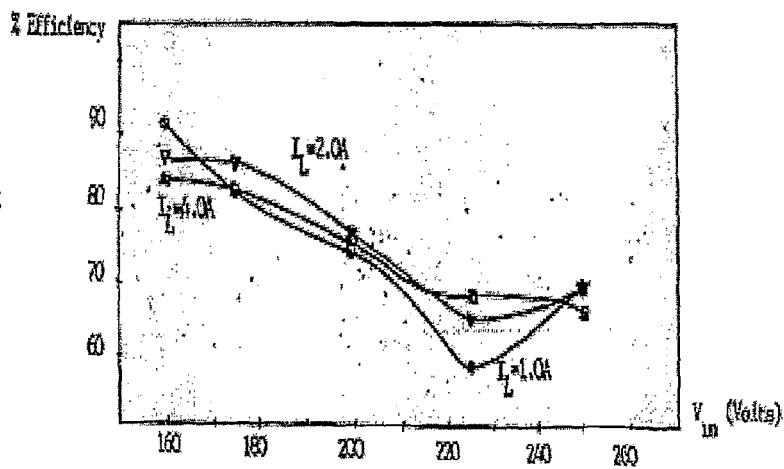
FIG. 14C depicts exemplary efficiency performance of an AC voltage regulator based on a 4-element power transistor array.

FIG. 13B illustrates a transformer T1 1308, which allows the boost or buck operation based on the input voltage. An output tap control circuit 1310 obtains an output sample 1318 from the AC output of the transformer T1 1308. However, an output sample 1318 may be obtained without an optional tap control circuit 1310 in other embodiments. The control circuit 1322 compares the actual AC output sample, converted to a DC value using a RMS-DC converter IC 1326, with a reference value and adjusts the current flowing by a current injection circuit 1324 in the series connected a multistage optoisolator 1316. The multistage optoisolator 1316 includes opto-isolator input diodes. This effectively controls the value of $R_{array}$ of the power transistor array 1314 in such a way that the loop keeps the output RMS value regulated via a bridge rectifier 1312 at a preset value, such as 230V, while the input keeps varying over a wide range. FIGS. 14A, 14B, and 14C indicate the performance of a 1 KVA prototype with a design as per FIG. 13B based on a four-element power transistor array built using Darlington pairs of 2N3773 and 2N4923, for example. The technique can be easily enhanced with a digital control subsystem to meet or exceed the efficiency of bulky ferro-resonant regulators. A major design advantage of this technique over the ferro-resonant regulators is the use of a smaller capacity ordinary transformer without any air gap in the core. By suitable control arrangements, transformer tap changes can also be incorporated to improve the overall efficiency, recognizing the fact that the methods according to embodiments has a higher efficiency at worst case sags, where only a minimum resistance value of the power transistor array is required.

B. Electronic AC Load

Another useful application of embodiments of the technique is in an electronic AC load. The design approach for an AC electronic load with processor control is illustrated in FIG. 6B. FIG. 6B illustrates the use of a processor coupled with the power transistor array where the current and the voltage of the power transistor array is fed into the ADC for setting the resistance. In some embodiments, the processor is an Atmel 8 bit processor. FIG. 9 depicts the software flow chart.

Figure 15A:
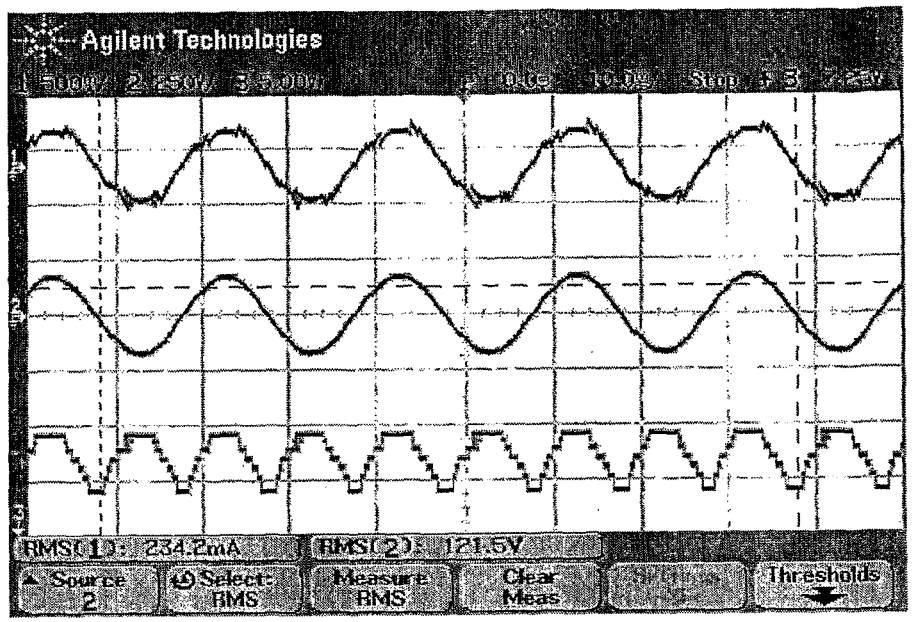
FIG. 15A depicts an exemplary waveform in the digitally controlled AC load.
Figure 15B:
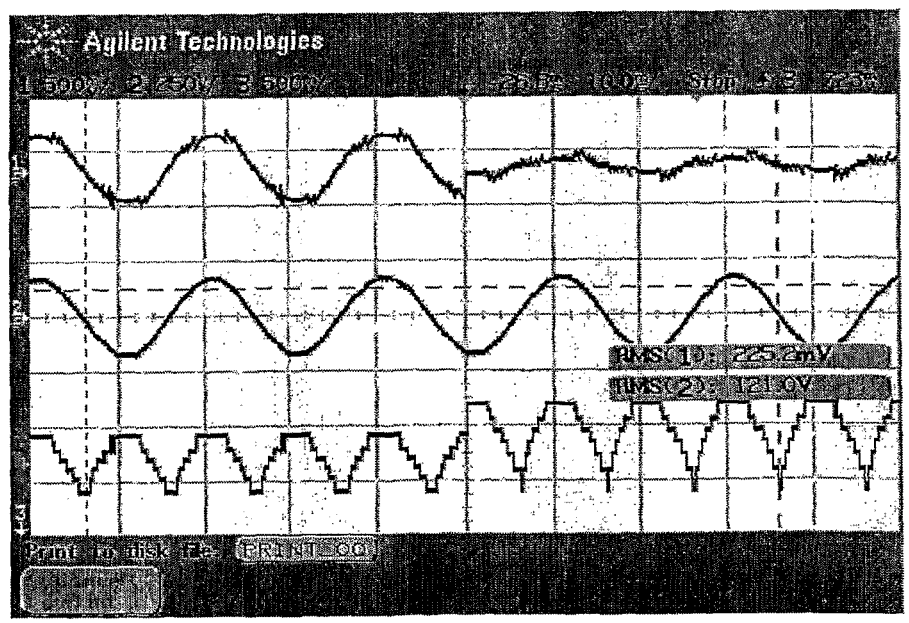
FIG. 15B depicts an exemplary waveform in a digitally controlled AC load.
Figure 16:
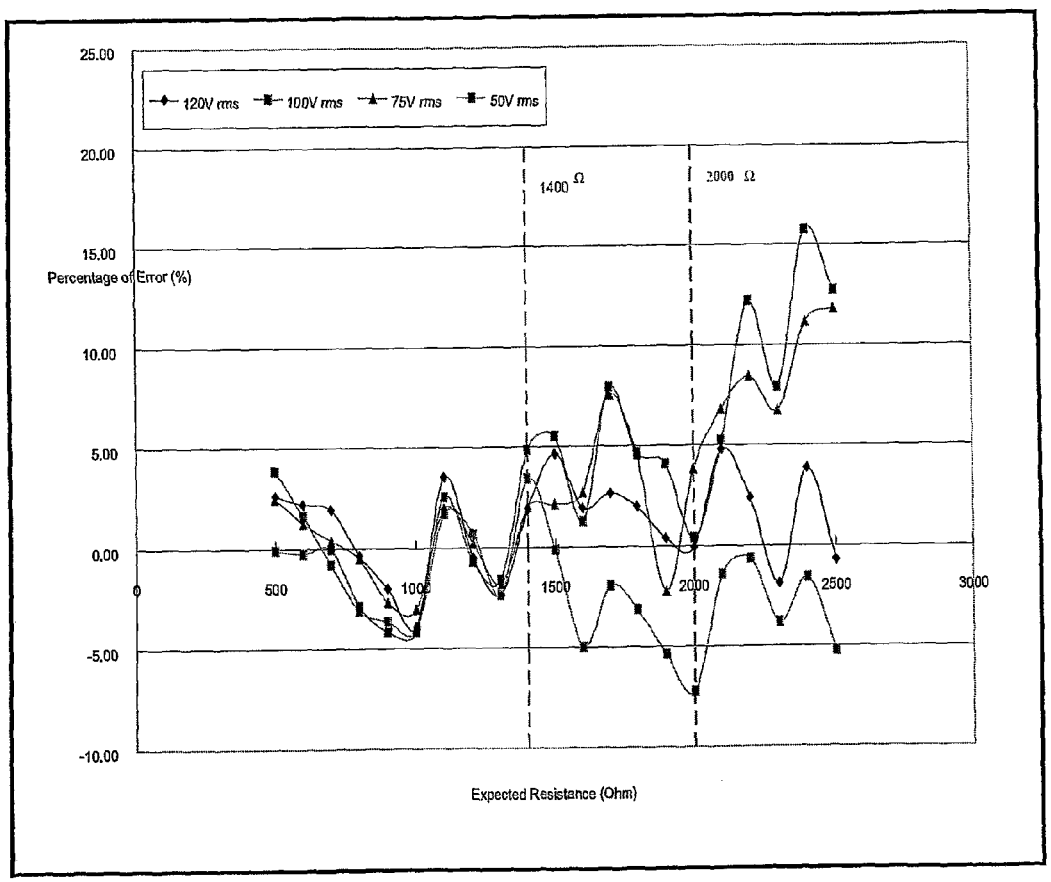
FIG. 16 depicts exemplary expected resistance as per loaded program and the actual percentage error achieved, without optimizing the system.

According to embodiments, the algorithms are used to set the required value of resistance from the power transistor array. Further, the algorithms vary the resistance according to program settings. FIG. 15A illustrates the exemplary voltage and current through the load and the control output of the D to A Converter (DAC) used. FIG. 15B illustrates exemplary transient behavior of the power transistor array and the associated DAC output with the program set to switch the resistance between 500Ω and 2000Ω. FIG. 16 illustrates exemplary expected resistance as per the loaded processor program and the actual percentage error achieved, without optimizing the system.

VI. Conclusion

The embodiments of using a power transistor array with an opto-isolator-based isolation and digital control can be used in several AC power control applications. AC voltage regulators and AC electronic loads are typical examples. With the availability of high power-high voltage IGBT modules, and using suitable design modifications, embodiments of the concept can be applied to much higher power requirements in electronic AC loads and fully solid state AC voltage regulators and power conditioners, etc. Given the overview of the AC regulator techniques used in single phase power quality improvement products for end user environments, embodiments of this technique has the potential for combining with higher efficiency AVR techniques, such as transformer tap changers, etc., to remove abrupt output changes associated with unwanted transients.

The foregoing descriptions of specific embodiments have been presented for purposes of illustration and description. They are not intended to be exhaustive or to limit the embodiments to the precise forms disclosed, and it should be understood that many modifications and variations are possible in light of the above teaching.

We claim:

1. An apparatus for regulating AC power of a power source in a power circuit, the apparatus comprising:
   a full-wave bridge rectifier configured to receive an AC input from the power source;

a power transistor array connected to the full-wave bridge rectifier, the power transistor array configured to receive the AC input from the full-wave bridge rectifier and to generate an AC signal;

a sampling circuit configured to receive a value of the voltage across the power transistor array;

an optocoupler connected to the power transistor array, wherein the optocoupler comprises at least two opto-isolators having photodiodes, and a controller connected to the sampling circuit, the controller configured to receive the value of the voltage from the sampling circuit and use said voltage value to calculate a correction output to send to the power transistor array through the optocoupler to control an AC impedance of the power circuit to generate an AC output, wherein the correction output is based on a slope value and an intercept value that characterize a linear approximation of the relationship between the voltage across the power transistor array and the current fed through the photodiodes of the opto-isolators for each value of expected power transistor array resistance.

2. The apparatus of claim 1, wherein the controller comprises:

an analog-to-digital converter configured to accept the value of the voltage from the sampling circuit;

a processor connected to the analog-to-digital converter, the processor configured to determine the correction output to send to the power transistor array; and a digital-to-analog convertor connected to the processor and the optocoupler, the digital-to-analog convertor configured to send the correction output to the power transistor array via the optocoupler.

3. The apparatus of claim 1, wherein the controller further comprises:

a memory for storing instructions implementable by a processor, the instructions comprising instructions for:

receiving the value of the voltage from the sampling circuit; and determining the correction output to send to the power transistor array to control the AC impedance of the power circuit.

4. The apparatus of claim 1, wherein the AC input is a waveform from a power supply.

5. The apparatus of claim 1, wherein the AC output is a sinusoidal wave.

6. The apparatus of claim 5, wherein a total harmonic distortion (THD) of the sinusoidal wave is within National Institute of Standards and Technology (NIST) limits.

7. The apparatus of claim 1, wherein the AC output is a waveform.

8. The apparatus of claim 7, wherein the waveform is mathematically defined and user-defined.

9. The apparatus of claim 1, wherein the AC output is a waveform related to the AC input.

10. The apparatus of claim 1, wherein the power transistor array includes a plurality of transistors connected in series.

11. The apparatus of claim 1, wherein the power transistor array includes only one transistor.

12. A computer-readable medium encoded with executable instructions for regulating AC power of a power source in a power circuit, the instructions comprising instructions for:

receiving a value of the voltage across a power transistor array from a sampling circuit;

generating a digital signal from the value of the voltage with an analog-to-digital converter; and determining a correction output based on the digital signal to send to the power transistor array via an optocoupler comprising at least two opto-isolators to control an AC impedance of the power circuit, wherein the correction output is based on a slope value and an intercept value that characterize a linear approximation of the relationship between the voltage across the power transistor array and the current fed through the photodiodes of the opto-isolators for each value of expected power transistor array resistance.

13. A method for regulating AC power of a power source in a power circuit, the method comprising;

receiving a value of the voltage across a power transistor array from a sampling circuit; and determining a correction output to send to the power transistor array via an optocoupler comprising at least two opto-isolators having photodiodes to control an AC impedance of the power circuit, wherein the correction output is based on a slope value and an intercept value that characterize a linear approximation of the relationship between the voltage across the power transistor array and the current fed through the photodiodes of the opto-isolators for each value of expected power transistor array resistance.

14. The method of claim 13, wherein determining the correction output comprises generating a digital signal from the value of the voltage with an analog-to-digital converter to determine the correction output.

* * * * *